United States Patent
Pelfrene et al.

(10) Patent No.: US 10,378,281 B2
(45) Date of Patent: Aug. 13, 2019

(54) PASSIVELY INDUCED FORCED VIBRATION ROCK DRILLING SYSTEM

(71) Applicant: VAREL EUROPE S.A.S., Pau (FR)

(72) Inventors: Gilles Pelfrene, Fontainebleau (FR); Olivier Ther, Paris (FR); Kenyon Y. Ripple, Houston, TX (US)

(73) Assignee: VAREL EUROPE S.A.S., Pau (FR)

( * ) Notice: Subject to any disclaimer, the term of this patent is extended or adjusted under 35 U.S.C. 154(b) by 202 days.

(21) Appl. No.: 15/599,112

(22) Filed: May 18, 2017

(65) Prior Publication Data

US 2017/0356249 A1    Dec. 14, 2017

(30) Foreign Application Priority Data

Jun. 13, 2016    (EP) .................................... 16305713

(51) Int. Cl.
*E21B 6/04*    (2006.01)
*E21B 10/36*    (2006.01)
(Continued)

(52) U.S. Cl.
CPC .................. *E21B 6/04* (2013.01); *E21B 6/02* (2013.01); *E21B 10/36* (2013.01); *E21B 10/42* (2013.01);
(Continued)

(58) Field of Classification Search
CPC ... E21B 6/04; E21B 6/02; E21B 10/36; E21B 10/42; E21B 17/042; E21B 44/00; E21B 10/62; E21B 6/00; F16F 3/02; F16F 1/32
See application file for complete search history.

(56) References Cited

U.S. PATENT DOCUMENTS 2,113,651 A * 4/1938 Heaston .................... E21B 6/00
                                                         175/299
2,628,498 A * 2/1953 Smith ..................... E21B 45/00
                                                         346/125
(Continued)

FOREIGN PATENT DOCUMENTS

GB    2439177    12/2007
GB    2439178    12/2007

OTHER PUBLICATIONS

Mitigating Vibrations & Slip-Stick in Challenging Formations; NeoTork; http://www.neo-oiltools.com/images/pdf/neooiltools-challenging-formations.pdf.
(Continued)

*Primary Examiner* — David J Bagnell
*Assistant Examiner* — Jonathan Malikasim

(57) ABSTRACT

A bottomhole assembly includes: a drill bit operable to vibrate when engaged with a formation and rotated; and a suspension sub including: a stator barrel for connection to a pipe string; a traveler barrel for connection to the drill bit; a slip joint longitudinally coupling the traveler barrel to the stator barrel while allowing movement of the traveler barrel between an extended position and a retracted position; a torsional joint connecting the traveler barrel to the stator barrel at and between the positions; and one or more springs disposed between the stator barrel and the traveler barrel. The suspension is tuned relative to the drill bit to: dampen the vibration of the drill bit when the BHA is rotated at a first angular velocity; and resonate the vibration of the drill bit when the BHA is rotated at a second angular velocity, thereby imparting percussive energy to the drill bit.

15 Claims, 7 Drawing Sheets

(51) Int. Cl.
*E21B 10/42* (2006.01)
*E21B 10/62* (2006.01)
*E21B 17/042* (2006.01)
*E21B 44/00* (2006.01)
*F16F 1/32* (2006.01)
*F16F 3/02* (2006.01)
*E21B 6/02* (2006.01)

(52) U.S. Cl.
CPC ............ *E21B 10/62* (2013.01); *E21B 17/042* (2013.01); *E21B 44/00* (2013.01); *F16F 1/32* (2013.01); *F16F 3/02* (2013.01)

(56) References Cited

U.S. PATENT DOCUMENTS

| | | | |
|---|---|---|---|
| 3,307,641 A * | 3/1967 | Wiggins, Jr. | E21B 7/24 173/202 |
| 3,768,576 A | 10/1973 | Martini | |
| 4,502,552 A | 3/1985 | Martini | |
| 5,083,623 A * | 1/1992 | Barrington | E21B 17/07 166/242.7 |
| 5,318,138 A | 6/1994 | Dewey | |
| 5,979,577 A * | 11/1999 | Fielder | E21B 10/43 175/431 |
| 6,234,728 B1 | 5/2001 | Brun-Picard | |
| 7,591,327 B2 | 9/2009 | Hall | |
| 7,654,344 B2 | 2/2010 | Haughom | |
| 9,033,069 B2 | 5/2015 | Zhang | |
| 9,068,400 B2 | 6/2015 | Wiercigroch | |
| 2012/0228029 A1 | 9/2012 | Reimers | |
| 2013/0333954 A1 | 12/2013 | Bellin | |
| 2016/0053545 A1 | 2/2016 | Holtz | |
| 2016/0053546 A1 | 2/2016 | Samuel | |
| 2016/0053547 A1 | 2/2016 | Samuel | |
| 2017/0081929 A1 | 3/2017 | Maw | |

OTHER PUBLICATIONS

EP Office Action; EP Patent Application No. 16 305 713.6-1002; dated Oct. 2, 2018.
European Search Report and Opinion; European Patent Application No. 16305713.6; dated Nov. 18, 2016.

* cited by examiner

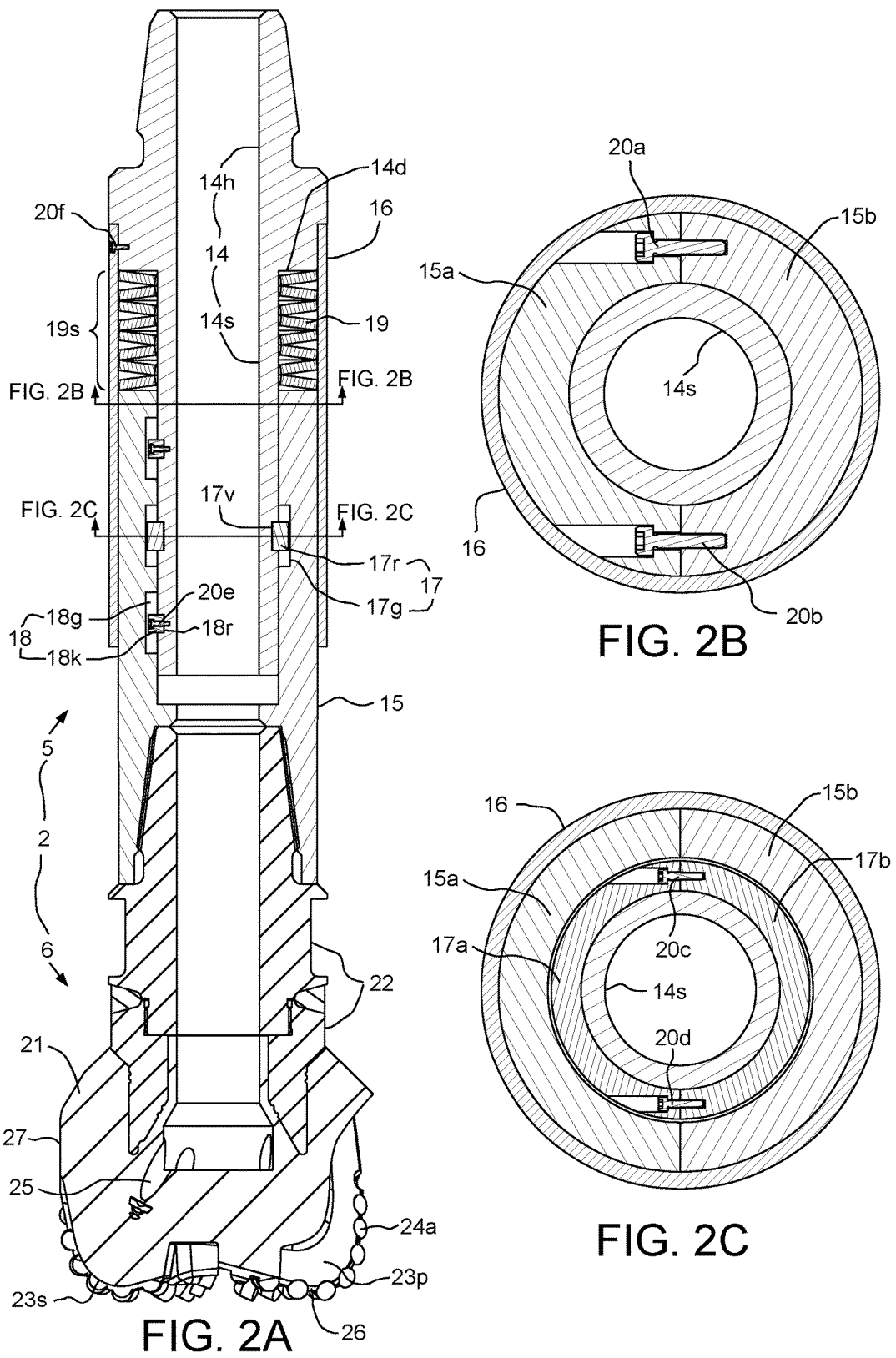

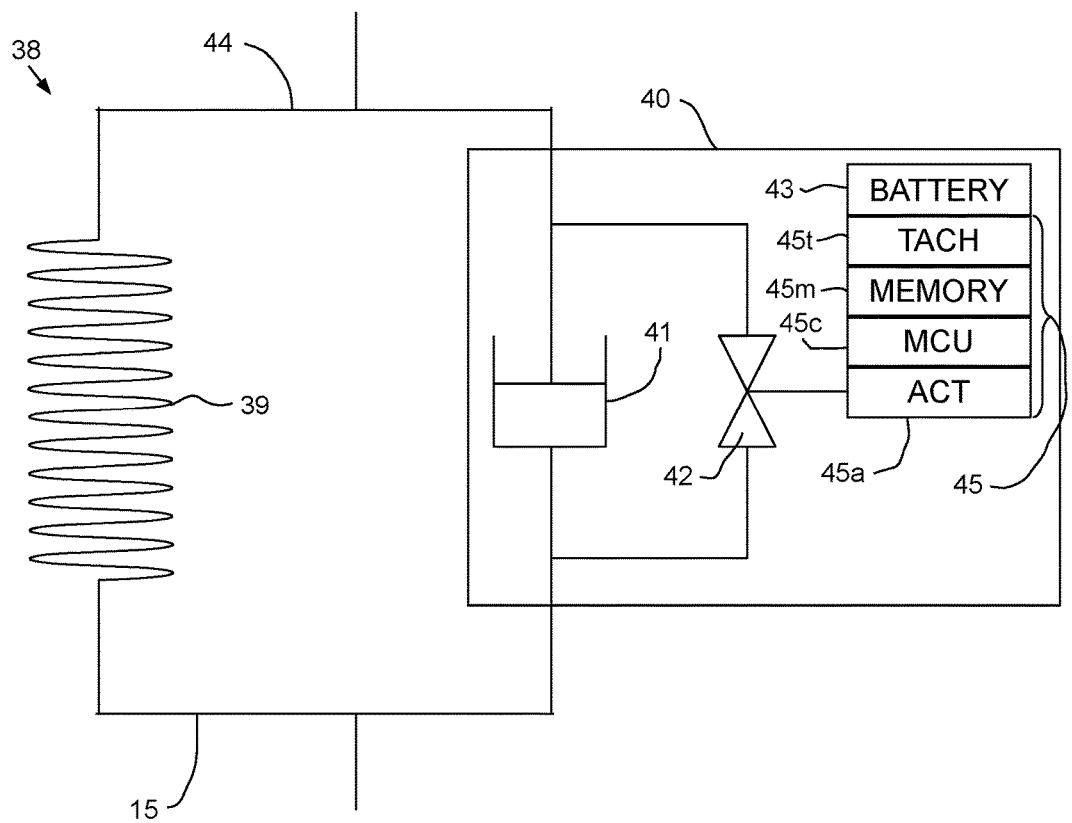
FIG. 7A
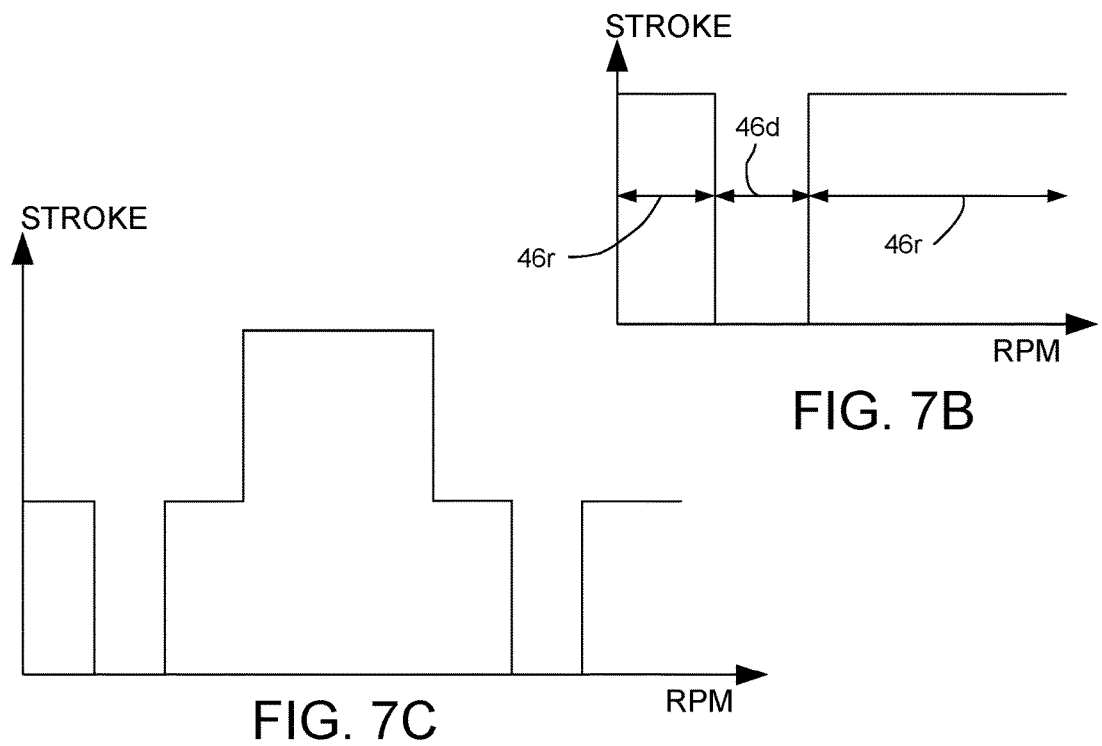
FIG. 7B
FIG. 7C

PASSIVELY INDUCED FORCED VIBRATION ROCK DRILLING SYSTEM

BACKGROUND OF THE DISCLOSURE

Field of the Disclosure

The present disclosure generally relates to a passively induced forced vibration rock drilling system.

Description of the Related Art

U.S. Pat. No. 7,591,327 discloses a method for drilling a bore hole including the steps of deploying a drill bit attached to a drill string in a well bore, the drill bit having an axial jack element with a distal end protruding beyond a working face of the drill bit; engaging the distal end of the jack element against the formation such that the formation applies a reaction force on the jack element while the drill string rotates; and applying a force on the jack element that opposes the reaction force such that the jack element vibrates and imposes a resonant frequency into the formation.

U.S. Pat. No. 9,033,069 discloses a drill bit having a bit body, at least one blade extending radially from the bit body, a plurality of blade cutting elements disposed on each blade, at least one journal extending downwardly and radially outward from a longitudinal axis of the drill bit, a roller cone or roller disc mounted rotatably to each journal, and a plurality of cutting elements disposed on each roller cone or roller disc, and methods for making the drill bit.

U.S. Pat. No. 9,068,400 discloses a method for controlling a resonance enhanced rotary drill including a rotary drill bit and an oscillator for applying axial oscillatory loading to the rotary drill bit, the method including: controlling frequency (f) of the oscillator in the resonance enhanced rotary drill whereby the frequency (f) is maintained in a specified range and controlling dynamic force of the oscillator in the resonance enhanced rotary drill whereby the dynamic force is maintained in a specified range wherein the frequency and the dynamic force of the oscillator are controlled by monitoring signals representing the compressive strength of the material being drilled and adjusting the frequency and the dynamic force of the oscillator using a closed loop real-time feedback mechanism according to changes in the compressive strength of the material being drilled.

U.S. Pat. No. 6,234,728 discloses a mounting attachment for a penetrating tool such as a drilling head on a machine with a machining shaft includes a support provided with means for coupling to a machine; a tool holder provided with means for fixing a tool; means for axially guiding the tool holder relative to the support; means for linking in rotation the tool holder and the support; and elastically deformable suspension means for suspending the tool holder from the support, the suspension means allowing axial translation and self-sustaining reciprocating or vibrating axial movements of the tool holder resulting from a controlled displacement of the support with respect to a workpiece.

U.S. Pat. No. 7,654,344 discloses a torque converter for use in drilling with a rotating drill bit, the purpose of the torque converter being to absorb impacts and bring about an axial movement of the drill bit when the torque exceeds a predetermined value. For this purpose the torque converter is composed of two cylindrical string parts connected through the bearing elements. The string parts are connected to each other through helical elements in such a way that relative rotation of the two cylindrical string parts brings about axial movement, which unloads the drill bit.

U.S. Pat. App. Pub. No. 2016/0053545 discloses a drilling system including a drill string extendable into a wellbore penetrating a subterranean formation. The subterranean formation exhibits a resonant frequency and a drill bit is coupled to a distal end of the drill string. A vibration sub is positioned within the drill string adjacent the drill bit for generating vibration stress waves at the drill bit, and the vibration stress waves exhibit a vibration frequency that approximates the resonant frequency.

U.S. Pat. App. Pub. No. 2016/0053546 discloses a bottom-hole assembly including a drill string extendable within a wellbore and a drill bit positioned at a distal end of the drill string. A vibration sub is positioned in the drill string axially adjacent the drill bit and includes one or more vibratory devices that impart vibration to the drill bit.

U.S. Pat. App. Pub. No. 2016/0053547 discloses a drill bit including a bit body and one or more cutters positioned on the bit body at select locations. At least one vibrational device is positioned on the bit body to impart vibration to the bit body and thereby mitigate stick-slip.

U.S. Pat. App. Pub. No. 2012/0228029 discloses a method for reducing friction between interconnected outer and inner helical members of a downhole damper where the damper includes an outer damper body and an inner damper body, and where the outer and inner damper bodies are telescopically movable relative each other, the outer and inner damper bodies being biased in the extending direction, and where one of the outer and inner damper bodies are connected to a drill bit workable at a borehole face, and where the other of the outer and inner damper bodies is connected to a torque and force transmitting member, and where the outer and inner helical parts are arranged so as to retract the bit from the face when torque applied by the torque and force transmitting member exceeds a preset value, wherein the method includes letting a relative movement between the inner and outer body force lubricant to flow between the helical members.

GB 2 439 177 discloses a device for a tool for use in drilling with a rotary drill bit, the purpose of the tool being to provide an axial movement of the drill bit when the torque exceeds a value given in advance. The drill bit is raised so that it is not damaged when the string is suddenly released following a jam. The tool is made up of two cylindrical string parts and connected through guide elements and seals and. The string parts are interconnected through spiral gearings. Relative rotation of the string parts and results in axial movement and compression of the spring to a predetermined pre-tensioning.

GB 2 439 178 discloses a device for a tool for use in drilling with a rotary drill bit, the purpose of the tool being to provide an axial movement of the drill bit when the torque exceeds a predetermined value. For this purpose the tool is made up of two cylindrical string parts connected through guide elements and seals. The string parts are interconnected through a rotationally rigid, axially movable toothing. Axial movement is achieved when the pressure differential between an internal pressure and an external pressure generates a force across the differential area, between the periphery of the string part and the periphery of the string part, which is greater than the pre-tensioned force of the spring.

SUMMARY OF THE DISCLOSURE

The present disclosure generally relates to a passively induced forced vibration rock drilling system. In one embodiment, a bottomhole assembly (BHA) includes: a drill bit operable to vibrate when engaged with a formation and rotated; and a suspension sub. The suspension sub includes: a stator barrel for connection to a pipe string; a traveler barrel for connection to the drill bit; a slip joint longitudinally coupling the traveler barrel to the stator barrel while allowing movement of the traveler barrel between an extended position and a retracted position; a torsional joint connecting the traveler barrel to the stator barrel at and between the positions; and one or more springs disposed between the stator barrel and the traveler barrel. The suspension sub is tuned relative to the drill bit to: dampen the vibration of the drill bit when the BHA is rotated at a first angular velocity; and resonate the vibration of the drill bit when the BHA is rotated at a second angular velocity, thereby imparting percussive energy to the drill bit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 2A-2C illustrate the BHA.

FIG. 7A illustrates a third alternative suspension sub usable with the BHA, according to another embodiment of the present disclosure. FIG. 7B illustrates a dynamic response of the third alternative suspension sub. FIG. 7C illustrates a dynamic response of a modified third alternative suspension sub.

DETAILED DESCRIPTION

Figure 1A:
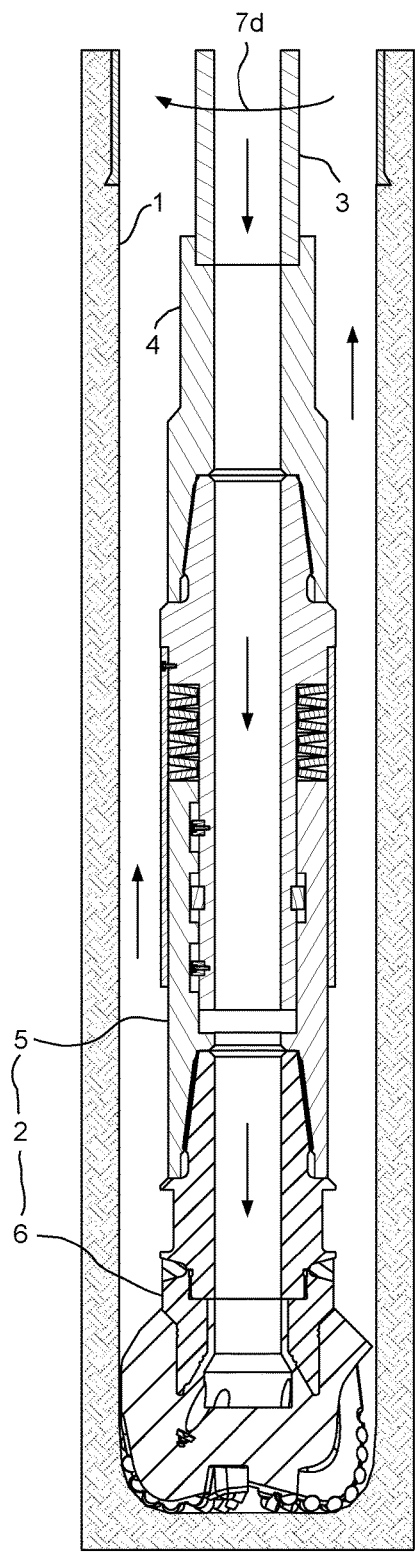
FIG. 1A illustrates drilling of a wellbore with a passively induced forced vibration bottomhole assembly (BHA) in a damping mode, according to one embodiment of the present disclosure.
Figure 1B:
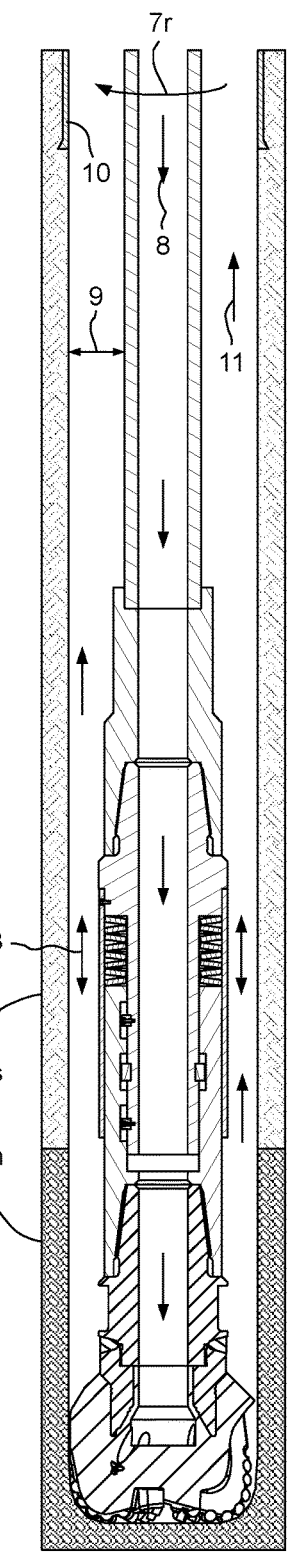
FIG. 1B illustrates drilling of the wellbore with the BHA in a resonant mode.
Figure 1C:
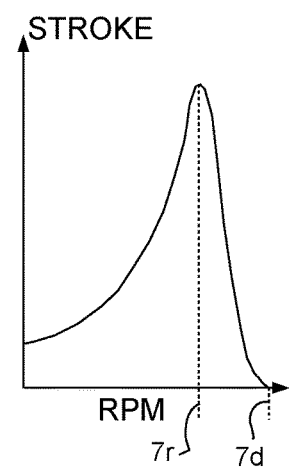
FIG. 1C illustrates a dynamic response of the BHA.

FIG. 1A illustrates drilling of a wellbore 1 with a passively induced forced vibration bottomhole assembly (BHA) 2 in a damping mode. FIG. 1B illustrates drilling of the wellbore 1 with the BHA 2 in a resonant mode. FIG. 1C illustrates a dynamic response of the BHA 2. The BHA 2 may be connected to a bottom of a pipe string 3, such as drill pipe or coiled tubing, thereby forming a drill string, and deployed into the wellbore 1. The BHA 2 may include one or more drill collars 4, a suspension sub 5, and a fixed cutter drill bit 6. The drill bit 6 may be rotated at a first angular velocity 7d, such as by rotation of the drill string from a rig (not shown) and/or by a drilling motor (not shown) of the BHA 2, while drilling fluid 8, such as mud, may be pumped down the drill string. Some of the weight of the drill string may be set on the drill bit 6 until the suspension sub is in a ready position (shown) between an extended position (not shown) and a retracted position (not shown). The drilling fluid 8 may be discharged by the drill bit 6 and carry cuttings up an annulus 9 formed between the drill string and the wellbore 1 and/or between the drill string and a casing string and/or liner string 10. The drilling fluid and cuttings are collectively referred to as returns 11.

The BHA 2 may be in the damping mode due to rotation thereof at the first angular velocity 7d. The damping mode may be selected when the wellbore 1 is being drilled through a soft formation 12s. In the damping mode, the suspension sub 5 may attenuate vibration of the drill bit 6 due to engagement with the soft formation 12s. This attenuation allows the fixed cutter drill bit 6 to operate in a shearing mode which is an efficient manner of cutting the rock due to the soft formation exhibiting ductile failure.

However, once a hard rock formation 12h is encountered, the shearing mode becomes inefficient. Once the hard rock formation 12h is encountered, the rotation of the BHA 2 may be reduced to a second angular velocity 7r, thereby shifting the BHA to a resonant mode. In the resonant mode, the suspension sub 5 may reciprocate 13 the drill bit 6 in response to the vibration thereof, thereby shifting operation of the drill bit to the percussive mode which is an efficient manner of cutting the rock due to the hard formation 12h exhibiting brittle failure.

Advantageously, the BHA 2 is a passive device that operates utilizing inherent vibration of the drill bit 6 created by operation thereof without using a resonator tool which requires an energy source.

Alternatively, the angular velocity may be increased instead of being reduced to shift the BHA 2 from the damping mode to the resonant mode.

FIGS. 2A-2C illustrate the BHA 2. The suspension sub 5 may include a stator 14, a traveler 15, an outer sleeve 16, a slip joint 17, one or more (pair shown) torsional joints 18, and one or more (eight shown) compression springs, such as Belleville washers 19. The suspension sub 5 may have a longitudinal bore therethrough for passage of the drilling fluid 8. The stator 14 may be an upper barrel and the traveler 15 may be a lower barrel. To facilitate assembly, the traveler 15 may include a pair of semi-cylindrical segments 15a, b connected together, such as by threaded fasteners 20a, b. The stator 14 may have a coupling, such as a threaded pin, formed at an upper end thereof for connection of the drill collar 4 to the suspension sub 5. The traveler 15 may have a coupling, such as a threaded box, formed at a lower end thereof for connection of the suspension sub 5 to the drill bit 6.

The slip joint 17 may allow the traveler 15 to longitudinally move relative to the stator 14 between an extended position (not shown) and a retracted position (not shown). The stator 14 may have an upper head 14h and a lower stem 14s having a reduced outer diameter relative to the head. A spring shoulder 14d may be formed between the head 14h and stem 14s portions of the stator 14. The traveler 15 may receive the stem 14s therein and a sliding fit may be formed between an outer surface of the stem and an inner surface of the traveler. The stator 14, the traveler 15, and the sleeve 16 may each be made from a metal or alloy, such as steel, stainless steel, or a nickel based alloy, having strength sufficient to support the weight and torque exerted on the drill bit 6 during drilling.

The slip joint 17 may include a stop ring 17r, a stop groove 17g, a retaining groove 17v, and one or more threaded fasteners 20c, d. To facilitate assembly, the stop ring 17r may include a pair of semi-arcuate segments 17a, b connected together, such as by the threaded fasteners 20c, d. The retaining groove 17v may be formed in an outer surface of the stem 14s and the stop ring may 17r may be assembled in the retaining groove, thereby longitudinally connecting the stop ring to the stator 14. The stop groove 17g may be formed in the inner surface of the traveler 15 and the traveler may be assembled such that the stop groove receives the stop ring 17r therein. The stop groove 17g may have a length greater than a length of the stop ring 17r, thereby allowing limited longitudinal movement of the traveler 15 relative to the stator 14. A differential between the length of the stop groove 17g and the length of the stop ring 17r may range between one-tenth of a millimeter and fifty millimeters. The stop ring 17r may be engaged with an upper end of the stop groove 17g when the suspension sub 5 is in the extended position and stop ring may be engaged with a lower end of the stop groove when the suspension sub is in the retracted position.

Each torsional joint 18 may include a key 18k, a retaining slot 18r, a guide slot 18g, and a threaded fastener 20e. Each retaining slot 18r may be formed in an outer surface of the stem 14s and the respective key 18k may be fastened to the stem in the retaining slot, thereby longitudinally and torsionally connecting the key to the stator 14. Each guide slot 18g may be formed in the inner surface of the traveler 15 and the traveler may be assembled such that the guide slot receives the respective key 18k therein. Each guide slot 18g may have a length greater than a length of the respective key 18k, thereby allowing limited longitudinal movement of the traveler 15 relative to the stator 14 while torsionally connecting the traveler to the stator such that the traveler rotates with the stator during drilling. A differential between the length of each guide slot 18g and the length of the respective key 18k may be greater than the differential between the length of the stop groove 17g and the length of the stop ring 17r.

A spring chamber may be formed longitudinally between the spring shoulder 14d and a top of the traveler 15. The spring chamber may be formed radially between an inner surface of the sleeve 16 and an outer surface of the stem 14s. The Belleville washers 19 may be disposed in the spring chamber and stacked 19s in a series (shown) arrangement and/or a parallel (FIG. 4) arrangement. The Belleville washers 19 may bias the suspension sub 5 toward the extended position. In the resonate mode, the Belleville washers 19 may store energy from the upward vibration of the drill bit 6 and expel the energy during downward vibration of the drill bit, thereby causing the stop ring 17r to strike the lower end of the stop groove and imparting percussive energy to the drill bit 6. In the damping mode, the Belleville washers 19 may attenuate the vibration of the drill bit 6 via friction between the individual washers.

An upper end of the sleeve 16 may be received in a recess formed in the outer surface of the head 14h and the sleeve may be longitudinally and torsionally connected to the stator 14, such as by the fastener 20f. The sleeve 16 may extend downward to cover the spring chamber and overlap an outer surface of the traveler 15. A sliding fit may be formed between an outer surface of the traveler 15 and an inner surface of the sleeve 16. The sleeve 16 may prevent the cuttings in the returns 11 from entering the spring chamber and obstructing operation of the Belleville washers 19.

Alternatively, a sliding seal may be carried by the stem 14s and may be engaged with a polished receptacle formed in an inner surface of the traveler 15, another sliding seal may be carried by the sleeve 16 and may be engaged with a polished outer surface of the traveler 15, lubricant may be disposed in the spring chamber, and a balanced lubricant reservoir may be formed in the head 14h.

Figure 3A:
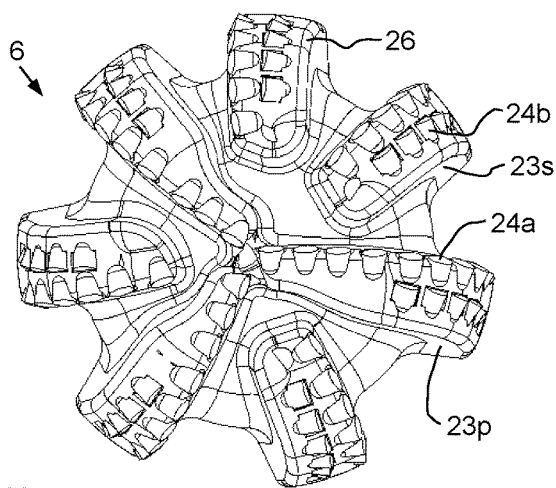
FIG. 3A illustrates a cutting face of a drill bit of the BHA.

FIG. 3A illustrates a cutting face of the drill bit 6. Referring also to FIG. 2A, the drill bit 6 may include a bit body 21, a shank 22, the cutting face, and a gage section. The shank 22 may be tubular and include an upper piece and a lower piece connected to the upper piece, such as by threaded couplings secured by a weld. The bit body 21 may be made from a composite material, such as a ceramic and/or cermet body powder infiltrated by a metallic binder. The bit body 21 may be mounted to the lower shank piece during molding thereof. The shank 22 may be made from a metal or alloy, such as steel, and have a coupling, such as a threaded pin, formed at an upper end thereof for connection of the drill bit 6 to the suspension sub 5. The shank 22 may have a flow bore formed therethrough and the flow bore may extend into the bit body 21 to a plenum thereof. The cutting face may form a lower end of the drill bit 6 and the gage section may form at an outer portion thereof.

Alternatively, the bit body 21 may be metallic, such as being made from steel, and may be hardfaced. The metallic bit body may be connected to a modified shank by threaded couplings and then secured by a weld.

The cutting face may include one or more (three shown) primary blades 23p, one or more (four shown) secondary blades 23s, fluid courses formed between the blades, leading cutters 24a, and backup cutters 24b. The blades 23p,s may be disposed around the cutting face and each blade may be formed during molding of the bit body 21 and may protrude from the bottom of the bit body. The primary blades 23p may each extend from a center of the cutting face to the gage section. One or more ports 25 may be formed in the bit body 21 and each port may extend from the plenum and through the bottom of the bit body to discharge drilling fluid 8 along the fluid courses. A nozzle (not shown) may be disposed in each port and fastened to the bit body 21. An inner set (not shown) of one or more of the ports 25 may be disposed adjacent to the center of the cutting face. The secondary blades 14s may extend from a location on the cutting face adjacent to the inner set of ports 25 to the gage section. Each blade 23p,s may extend generally radially from the cutting face to the gage section with a slight spiral curvature.

Each blade 23p,s may be made from the same material as the bit body 21. The leading cutters 24a may be mounted in pockets formed along leading edges of the blades 23p,s, such as by brazing. The backup cutters 24b may be mounted in pockets formed along bottoms of the blades 23p,s, such as by brazing. Each backup cutter 24b may be aligned or slightly offset from a respective leading cutter 24a. The backup cutters 24b may or may not fully extend to the gage section. Each cutter 24a, b may include a superhard cutting table, such as polycrystalline diamond, attached to a hard substrate, such as a cermet, thereby forming a compact, such as a polycrystalline diamond compact (PDC). A lower tip 26 of each blade 14p,s may impregnated with a superhard material, such as diamond, to enhance abrasion resistance.

The gage section may include a plurality of gage pads 27 and junk slots formed between the gage pads. The junk slots may be in fluid communication with the fluid courses formed between the blades 23p,s. The gage pads 27 may be disposed around the gage section and each pad may be formed during molding of the bit body 12 and may protrude from the outer portion of the bit body. Each gage pad 27 may be made from the same material as the bit body and each gage pad may be formed integrally with a respective blade 23p,s.

Figure 3D:
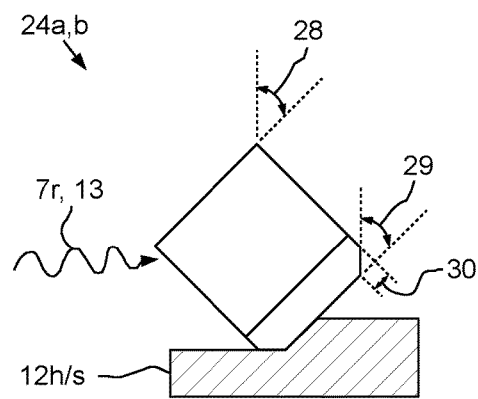
FIG. 3D illustrates a cutter of the drill bit.

FIG. 3D illustrates one of the cutters 24a, b. Each cutter 24a, b may be mounted, such as brazed, in the respective pocket at a back rake angle 28 ranging from thirty to forty-five degrees. Each cutter 24a, b may have a chamfer formed in a edge of the cutting table. An angle 29 of each chamfer may range between thirty and sixty degrees and a height 30 of each chamfer may range between six-tenths of a millimeter and one and a half millimeters. The large back rake angle 28 and/or large chamfer height 30 may improve the impact resistance of the cutters 24a, b to withstand drilling in the resonance mode. This improvement in impact resistance may come with some sacrifice of cutting efficiency.

Alternatively, the back rake angle 28 may range between zero and sixty degrees, the chamfer angle 29 may range between thirty and eighty degrees, and/or the chamfer height 30 may range between one-tenth of a millimeter and three millimeters.

Figure 3B:
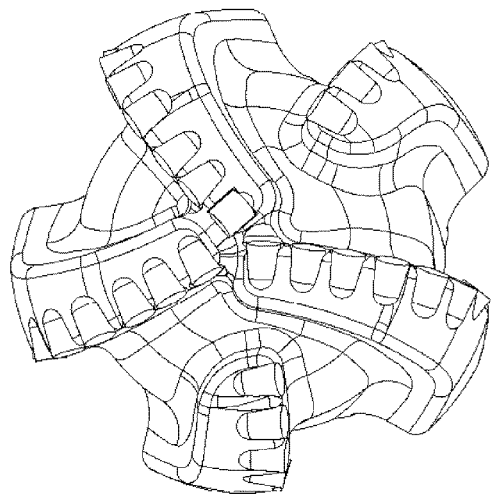
FIGS. 3B and 3C illustrate cutting faces of first and second alternative drill bits usable with the BHA, according to other embodiments of the present disclosure.
Figure 3C:
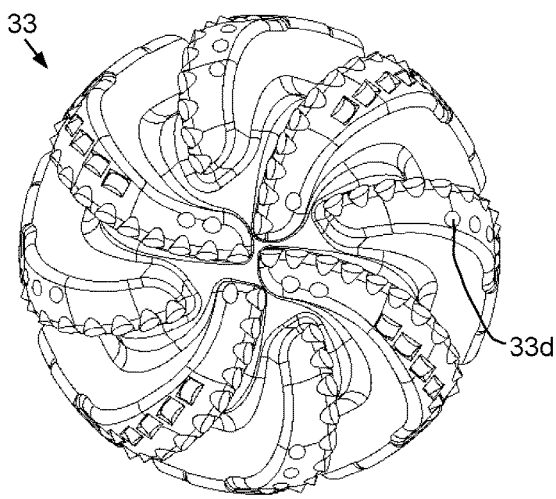

FIGS. 3B and 3C illustrate cutting faces of first 32 and second 33 alternative drill bits usable with the BHA 2, according to other embodiments of the present disclosure. Either the first alternative drill bit 32 or the second alternative drill bit 33 may be connected to the suspension sub 5 instead of the drill bit 6. The first alternative drill bit 32 may be similar to the drill bit 6 except for omission of two secondary blades 23s and omission of the backup cutters 24b.

Alternatively, the drill bit 6 may have the backup cutters 24b omitted therefrom. Alternatively, the first alternative drill bit 32 may have the backup cutters 24b.

The second alternative drill bit 33 may be similar to the drill bit 6 except for addition of a primary blade 23p, the blades being more spiral, shock studs 33d being located on portions of the primary blades adjacent to the center of the cutting face and peripheral portions of the secondary blades 23s. Each shock stud 33d may be made from a cermet and may or may not be impregnated with a superhard material, such as diamond, to enhance abrasion resistance.

Alternatively, shock rings, such as o-rings, may be used instead of the shock studs 33d. Alternatively, the drill bit 6 and/or the first alternative drill bit 32 may have the shock studs 33d and/or the spiral blades. Alternatively, second alternative drill bit 33 may have the secondary cutters omitted therefrom, may have the radial blades and/or may have the shock studs 33d omitted therefrom.

Alternatively, a roller cone drill bit, hammer drill bit, or impregnated drill bit may be connected to the suspension sub 5 instead of the fixed cutter drill bit 6.

Figure 4:
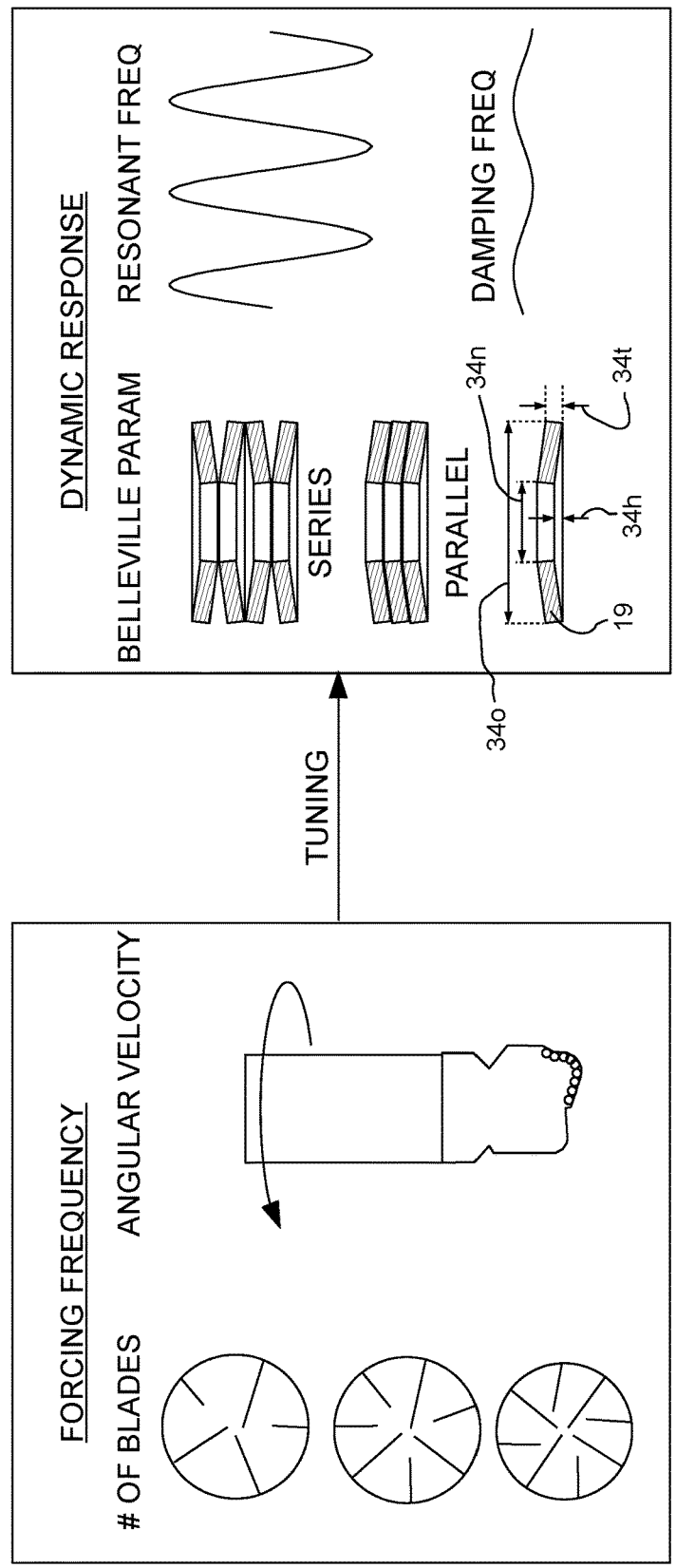
FIG. 4 illustrates tuning of the BHA.

FIG. 4 illustrates tuning of the BHA 2. In order to tune the suspension sub 5, the forcing frequency of the drill bit 6, 32, 33 may be determined. The forcing frequency may be determined by multiplying the total (primary and secondary) number of blades by the angular velocity of the BHA 2 in revolutions per second. Either the desired angular velocity for drilling the soft formation 12s or the hard formation 12h may be used. For example, assuming that the drill bit 6 is selected and the BHA is to be rotated at sixty revolutions per minute (RPM) (one revolution per second) in the soft formation 12s, then the forcing frequency would be equal to seven Hertz (Hz). The forcing frequency may then be used to configure the Belleville washers 19 to exhibit a damping frequency at seven Hz (or resonant frequency if the angular velocity is desired instead for the hard formation 12h).

The parameters of the Belleville washers 19 that may be varied to select a stack configuration exhibiting the damping frequency at the forcing frequency include: inner diameter 34n of each Belleville washer, outer diameter 34o of each Belleville washer, height 34h of each Belleville washer, thickness 34t of each Belleville washer, number of Belleville washers in the stack 19s, and whether the Belleville washers are stacked in series and/or parallel. The selection of the parameters may be facilitated by dynamic modeling software executed on a computer.

Once the configuration of the stack 19s of Belleville washers 19 has been determined, then the resonant frequency of the stack may be determined and used to determine the angular velocity of the BHA 2 to shift from the damping mode to the resonant mode (or vice versa, if the resonant frequency was used to configure the stack instead of the damping frequency).

If the suspension sub 5 has already been designed and/or manufactured, then the diameters 34n,o may be fixed and the number in the stack 19s may be limited; however, the stack may be shorter than the height of the spring chamber and then shimmed to the height of the spring chamber.

Further, some parameters of the drill bit 6 may be used to after the dynamic response of the suspension sub 5. For example, inclusion of the backup cutters 24b may serve to flatten the peak of the resonant frequency and create a resonant frequency band versus omission thereof. Increasing spiraling of the blades 14p,s may also serve to flatten the peak of the resonant frequency and create a resonant frequency band versus radial blades. Further, weight on bit may be adjusted during drilling to adjust the stroke of the suspension sub in the resonant mode.

Figure 5:
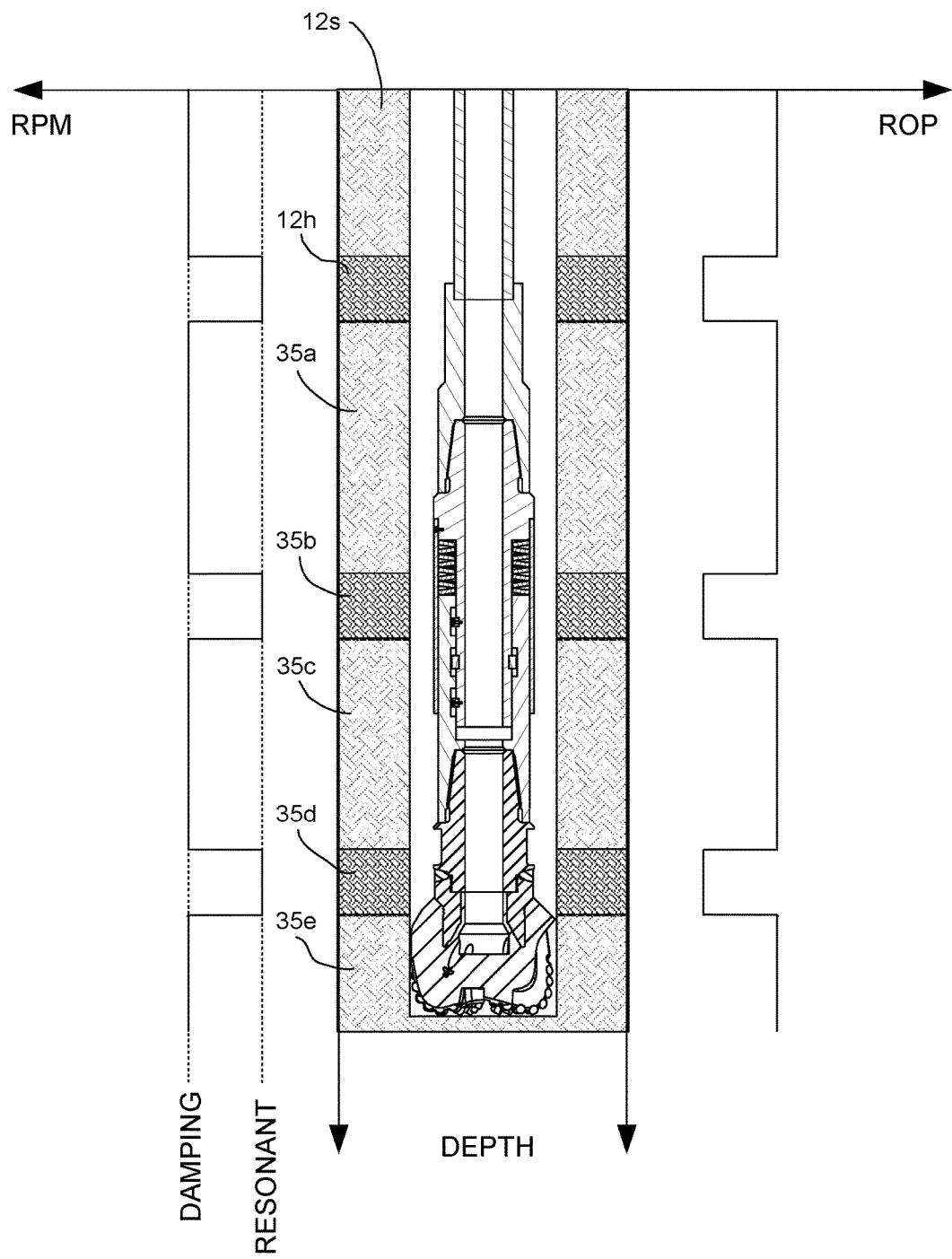
FIG. 5 illustrates further drilling of the wellbore using the BHA.

FIG. 5 illustrates further drilling of the wellbore using the BHA 2. A rate of penetration (ROP) may decrease as the drill bit 6 drills through the hard formation 12h. Once the hard formation 12h has been drilled through with the suspension sub 5 in the resonant mode, the suspension sub may be shifted back to the damping mode for drilling through a second soft formation 35a by increasing rotation back to the first angular velocity 7d. Once the second soft formation 35a has been drilled through, the suspension sub 5 may be shifted back to the resonant mode for drilling through a second hard formation 35b by decreasing rotation back to the second angular velocity 7r. Once the second hard formation 35b has been drilled through, the suspension sub 5 may be shifted back to the damping mode for drilling through a third soft formation 35c by increasing rotation back to the first angular velocity 7d. Once the third soft formation 35c has been drilled through, the suspension sub 5 may be shifted back to the resonant mode for drilling through a third hard formation 35d by decreasing rotation back to the second angular velocity 7r. Once the third hard formation 35d has been drilled through, the suspension sub 5 may be shifted back to the damping mode for drilling through a fourth soft formation 35e by increasing rotation back to the first angular velocity 7d.

A prior art solution to drilling the wellbore involves drilling the soft formations 12s, 35a, c, e with a PDC drill bit and drilling the hard formations 7h, 35b, d with a roller cone drill bit. This means that each time a different formation is encountered, the drill string must be retrieved to a drilling rig at surface, the drill bit changed, and the drill string re-deployed into the wellbore (aka a round trip), thereby resulting in six additional round trips to finish drilling the wellbore. While the BHA 2 will likely not achieve the ROP of either the PDC drill bit drilling through the soft formations or the roller cone drill bit drilling through the hard formations, the BHA is capable of drilling the entire wellbore without the additional six round trips to swap the drill bits which will result in much less rig deployment time to drill the wellbore 1.

Figure 6A:
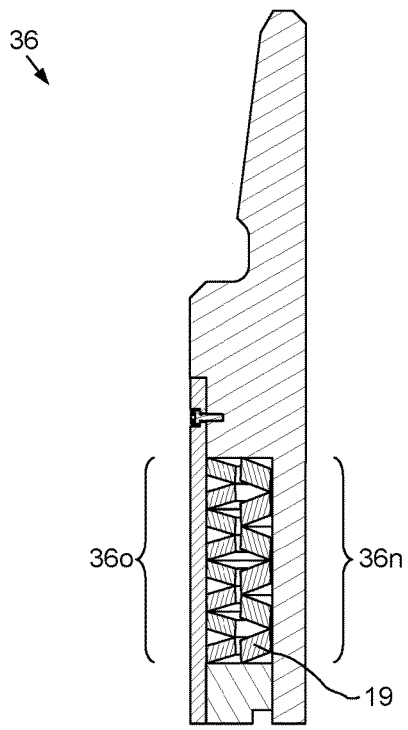
FIGS. 6A and 6B illustrate a first alternative suspension sub usable with the BHA, according to another embodiment of the present disclosure.
Figure 6C:
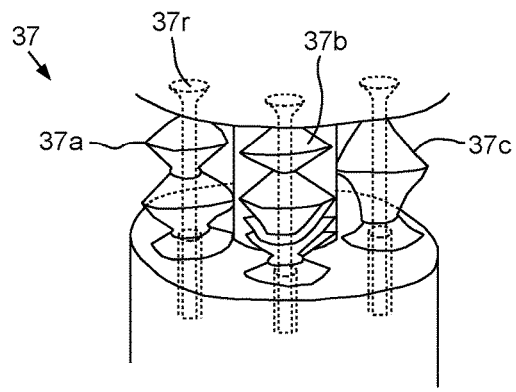
FIGS. 6C and 6D illustrate a second alternative suspension sub usable with the BHA, according to another embodiment of the present disclosure.
Figure 6B:
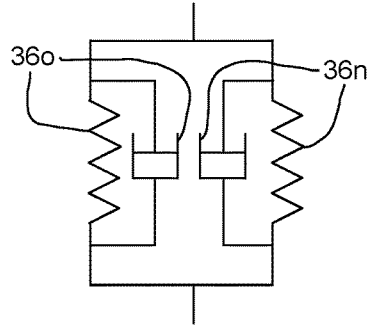

FIGS. 6A and 6B illustrate a first alternative suspension sub 36 usable with the BHA 2, according to another embodiment of the present disclosure. The first alternative suspension sub 36 may be assembled as part of the BHA 2 instead of the suspension sub 5. The first alternative suspension sub 36 may be similar to the suspension sub 5 except for including an inner stack 36n of Belleville washers 19 and an outer stack 36o of Belleville washers disposed in the spring chamber. The outer stack 36o may be concentrically disposed about the inner stack 36n. The outer stack 36o may have at least one parameter different from the inner stack 36n, such as the outer stack having a different number of Belleville washers (eight versus six as shown). The first alternative suspension sub 36 having two stacks 36n,o may add an additional set of resonant and damping frequencies (see FIG. 6E) to the dynamic response, thereby allowing more flexibility in tuning.

Figure 6D:
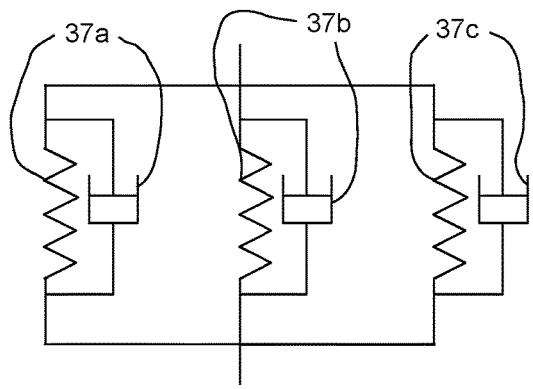

In the circuit diagrams of FIGS. 6B and 6D, the Belleville washers 36n, o, 37a-c are depicted by both a spring element and a damping element due to the complex dynamic response thereof.

Alternatively, the inner stack 36n and/or the outer stack 36o may include only one Belleville washer 19.

Figure 6E:
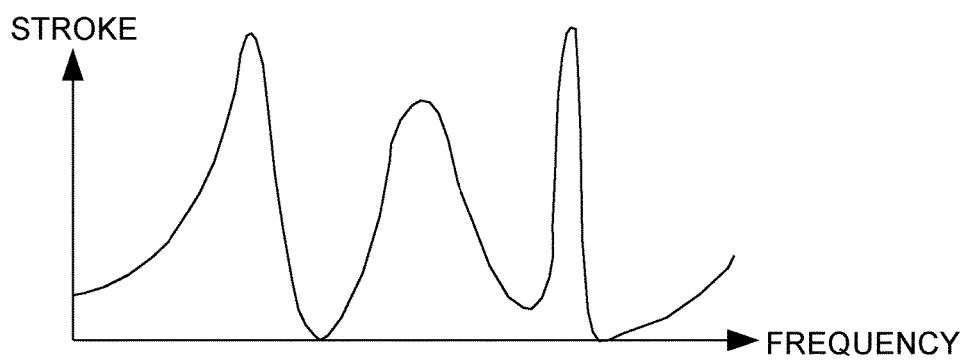
FIG. 6E illustrates a dynamic response of the second alternative suspension sub.

FIGS. 6C and 6D illustrate a second alternative suspension sub 37 usable with the BHA 2, according to another embodiment of the present disclosure. FIG. 6E illustrates a dynamic response of the second alternative suspension sub 37. The second alternative suspension sub 37 may be assembled as part of the BHA 2 instead of the suspension sub 5. The second alternative suspension sub 37 may be similar to the suspension sub 5 except for including a plurality 37a-c of stacks of Belleville washers 19 disposed in the spring chamber and a guide rod 37r for each stack. Each guide rod 37r may be connected to the stator, extend through the spring chamber and be received in a guide passage formed in the traveler. The stacks 37a-c may be eccentrically disposed about the spring chamber and each stack may be disposed around a respective guide rod 37r. Each stack 37a-c may have at least one parameter different from the other stacks, such as the first stack 37a having five Belleville washers 19 arranged in series, the second stack 37b having seven Belleville washers arranged in series and parallel, and a third stack 37c having three Belleville washers arranged in series. The second alternative suspension sub 37 having three stacks 37a-c may add two additional sets of resonant and damping frequencies to the dynamic response, thereby allowing more flexibility in tuning.

FIG. 7A illustrates a third alternative suspension sub 38 usable with the BHA 2, according to another embodiment of the present disclosure. FIG. 7B illustrates a dynamic response of the third alternative suspension sub 38. The third alternative suspension sub 38 may be assembled as part of the BHA 2 instead of the suspension sub 5. The third alternative suspension sub 38 may include a modified stator 44, the traveler 15, the outer sleeve 16 (not shown), the slip joint 17 (not shown), the torsional joint(s) 18 (not shown), a spring 39, a variable damper 40, and sliding seals (not shown) sealing the interfaces between the modified stator and the traveler and between the outer sleeve and the traveler. Due to provision of the variable damper 40, the spring 39 may be another type besides a Belleville washer, such as any other type of compression spring or any type of tension spring, such as a coil spring, gas spring, or wave spring.

The modified stator 44 may be similar to the stator 14 except for having a balanced hydraulic fluid reservoir (not shown) disposed in the head (not shown) thereof and hydraulic passages formed therein and extending between the reservoir and the spring chamber. The spring 39 may be disposed in the spring chamber and hydraulic fluid, such as refined and/or synthetic oil, may be disposed in the spring chamber and the reservoir. The variable damper 40 may include a dashpot 41, a bypass valve 42, a battery 43, and an electronics package 45. The electronics package 45 may include one or more circuits integrated on a printed circuit board (not shown), such as a tachometer 45t, a memory unit 45m, a microcontroller 45c, and an actuator 45a. The modified stator 44 may also have an electronics chamber (not shown) formed therein for housing the electronics package 45 and the battery 43. The battery 43 may be in electrical communication with the electronics package 45.

The tachometer 45t may be operable to measure the angular velocity of the BHA 2 and report the measurement to the microcontroller 45c. The memory unit 45m may be preprogrammed with a resonant angular velocity band 46r and a damping angular velocity band 46d. The dashpot 41 may be a fixed choke disposed in a first one of the hydraulic passages and the bypass valve 42 may be disposed in a second one of the hydraulic passages. The bypass valve 42 may be a shutoff valve operable between an open position and a closed position. The open position may provide unrestricted fluid communication between the reservoir and the spring chamber, thereby bypassing the dashpot 41, and the closed position may block fluid flow along the second passage, thereby forcing fluid flow along only the first passage through the dashpot. The actuator 45a may be a linear or rotary electric actuator operable to move the bypass valve 42 between the positions.

In operation, the microcontroller 45c may monitor the angular velocity measurement from the tachometer 45t and compare the measurement to the frequency bands 46d, r stored in the memory unit 45m and the current mode that the variable damper 40 is in (active or bypassed). The active mode may place the third alternative suspension sub 38 in the damping mode and the bypassed mode may place the third alternative suspension sub in the resonant mode. If the variable damper 40 is in the correct mode, the microcontroller 45c may take no action. If the variable damper is not in the correct mode, then the microcontroller may operate the actuator 45a to open or close the bypass valve 42 to shift the variable damper 40 to the correct mode.

Alternatively, the spring 39 may be a stack of two or more springs (same or different type) in series. Alternatively, third alternative suspension sub 38 may include a second spring or stack of springs in parallel with the spring 39, either concentrically or eccentrically arranged. Alternatively, the spring 39 may be one or more Belleville washers. Alternatively, the variable damper 40 may be disposed in a series arrangement with the spring 39. Alternatively, the modified stator 44 may include a third hydraulic passage with a check valve oriented to allow unrestricted fluid flow from the reservoir to the spring chamber and prevent reverse flow therethrough.

FIG. 7C illustrates a dynamic response of a modified third alternative suspension sub. The modified third alternative suspension sub may be similar to the third alternative suspension sub 38 except for the dashpot 41 being a variable choke valve instead of a fixed choke, thereby providing for more control over the dynamic response of the modified third alternative suspension sub. The electronics package may include a second actuator for operating the variable choke valve. For example, opening of the bypass valve 42 may exhibit a full resonant mode having a full stroke amplitude at a first frequency band, closing of the bypass valve and actuation of the variable choke valve to a relaxed setting may exhibit a partial resonant mode having a partial amplitude (relative to full stroke) at a second frequency band, and closing of the bypass valve and actuation of the variable choke valve to a constricted setting may exhibit the damping mode.

While the foregoing is directed to embodiments of the present disclosure, other and further embodiments of the disclosure may be devised without departing from the basic scope thereof, and the scope of the invention is determined by the claims that follow.

The invention claimed is:
1. A bottomhole assembly (BHA), comprising:
   a drill bit operable to vibrate when engaged with a formation and rotated; and
   a suspension sub comprising:
      a stator barrel for connection to a pipe string;
      a traveler barrel for connection to the drill bit;
      a slip joint longitudinally coupling the traveler barrel to the stator barrel while allowing movement of the traveler barrel between an extended position and a retracted position;
      a torsional joint connecting the traveler barrel to the stator barrel at and between the positions;
      one or more springs disposed between the stator barrel and the traveler barrel; and
      a variable damper having a damping mode and a resonant mode and operable to:
         dampen the vibration of the drill bit when the BHA is rotated at a first angular velocity in the damping mode; and
         resonate the vibration of the drill bit when the BHA is rotated at a second angular velocity, thereby imparting percussive energy to the drill bit, in the resonant mode,
      wherein the variable damper comprises:
         a dashpot; and
         an electronics package comprising:
            an actuator operable to shift the variable damper between the damping mode and the resonant mode;
            a tachometer operable to measure the angular velocity of the BHA;
            a memory unit operable to store the first and second angular velocities; and
            a microcontroller in communication with the tachometer, the memory unit, and the actuator and operable to activate the actuator in response to a comparison between the measured angular velocity and the first and second angular velocities.
2. The BHA of claim 1, wherein the one or more springs are a stack of Belleville washers.
3. The BHA of claim 1, wherein the suspension sub further comprises a second one or more springs concentrically arranged with the one or more springs.
4. The BHA of claim 1, wherein the suspension sub further comprises a second one or more springs eccentrically arranged with the one or more springs.

5. The BHA of claim 1, wherein the drill bit comprises:
   a shank having a threaded coupling formed at an upper end thereof;
   a bit body mounted to a lower end of the shank and having a plenum;
   a gage section forming an outer portion of the drill bit; and
   a cutting face forming a lower end of the drill bit and comprising:
      a plurality of blades protruding from a bottom of the bit body and extending from a center of the cutting face to the gage section; and
      a plurality of cutters mounted along each blade.
6. The BHA of claim 5, wherein each cutter has a back rake angle ranging between zero and sixty degrees.
7. The BHA of claim 5, wherein:
   each cutter has a chamfer formed in an edge of a cutting table thereof, and
   each chamfer has a height ranging between one-tenth of a millimeter and three millimeters.
8. The BHA of claim 1, wherein:
   the one or more springs are disposed in a spring chamber formed between the stator barrel and the traveler barrel,
   the suspension sub further comprises:
      hydraulic fluid disposed in the spring chamber;
      a hydraulic reservoir; and
      a hydraulic passage extending between the spring chamber and the hydraulic reservoir, and
   the dashpot is disposed in the hydraulic passage.
9. The BHA of claim 8, wherein:
   the suspension sub further comprises a second hydraulic passage extending between the spring chamber and the hydraulic reservoir, and
   the variable damper further comprises a bypass valve disposed in the second hydraulic passage.
10. The BHA of claim 9, wherein:
    the electronics package further comprises
    a battery, and
    the actuator is operable to shift the bypass valve.
11. The BHA of claim 8, wherein the dashpot is either a fixed choke or a variable choke valve.
12. A method of drilling a wellbore using the BHA of claim 1, comprising:
    connecting the BHA to a bottom of the pipe string, thereby forming a drill string;
    lowering the drill string into the wellbore until the drill bit is proximate a bottom thereof;
    exerting weight on the drill bit to move the suspension sub to a ready position between the extended position and the retracted position;
    rotating the BHA at the first angular velocity and injecting drilling fluid through the drill string, thereby drilling through a soft formation with the suspension sub in the damping mode; and
    changing the angular velocity to the second angular velocity in response to reaching a hard formation, thereby drilling through the hard formation with the suspension sub in the resonant mode.
13. A bottomhole assembly (BHA), comprising:
    a drill bit operable to vibrate when engaged with a formation and rotated; and
    a suspension sub comprising:
       a stator barrel for connection to a pipe string;
       a traveler barrel for connection to the drill bit;
       a slip joint longitudinally coupling the traveler barrel to the stator barrel while allowing movement of the traveler barrel between an extended position and a retracted position;

a torsional joint connecting the traveler barrel to the stator barrel at and between the positions; and
one or more springs disposed between the stator barrel and the traveler barrel,
wherein the suspension sub is tuned relative to the drill bit to:
dampen the vibration of the drill bit when the BHA is rotated at a first angular velocity; and
resonate the vibration of the drill bit when the BHA is rotated at a second angular velocity, thereby imparting percussive energy to the drill bit,
wherein:
the suspension sub further comprises a variable damper operable to dampen the vibration of the drill bit,
the one or more springs are disposed in a spring chamber formed between the stator barrel and the traveler barrel,
the suspension sub further comprises:
hydraulic fluid disposed in the spring chamber;
a hydraulic reservoir; and
a hydraulic passage extending between the spring chamber and the hydraulic reservoir,
the variable damper comprises a dashpot disposed in the hydraulic passage,
the suspension sub further comprises a second hydraulic passage extending between the spring chamber and the hydraulic reservoir, and
the variable damper further comprises a bypass valve disposed in the second hydraulic passage.

14. The BHA of claim 13, wherein:
the variable damper further comprises an electronics package, and
the electronics package comprises:
a battery;
a tachometer operable to measure the angular velocity of the BHA;
a memory unit operable to store the first and second angular velocities;
an actuator operable to shift the bypass valve; and
a microcontroller in communication with the tachometer, the memory unit, and the actuator and operable to activate the actuator in response to a comparison between the measured angular velocity and the first and second angular velocities.

15. A bottomhole assembly (BHA), comprising:
a drill bit operable to vibrate when engaged with a formation and rotated; and
a suspension sub comprising:
a stator barrel for connection to a pipe string;
a traveler barrel for connection to the drill bit;
a slip joint longitudinally coupling the traveler barrel to the stator barrel while allowing movement of the traveler barrel between an extended position and a retracted position;
a torsional joint connecting the traveler barrel to the stator barrel at and between the positions; and
one or more springs disposed between the stator barrel and the traveler barrel,
wherein the suspension sub is tuned relative to the drill bit to:
dampen the vibration of the drill bit when the BHA is rotated at a first angular velocity; and
resonate the vibration of the drill bit when the BHA is rotated at a second angular velocity, thereby imparting percussive energy to the drill bit,
wherein:
the suspension sub further comprises a variable damper operable to dampen the vibration of the drill bit,
the one or more springs are disposed in a spring chamber formed between the stator barrel and the traveler barrel,
the suspension sub further comprises:
hydraulic fluid disposed in the spring chamber;
a hydraulic reservoir; and
a hydraulic passage extending between the spring chamber and the hydraulic reservoir,
the variable damper comprises a dashpot disposed in the hydraulic passage, and
the dashpot is either a fixed choke or a variable choke valve.

* * * * *